US006560673B2

(12) United States Patent
Elliott

(10) Patent No.: US 6,560,673 B2
(45) Date of Patent: May 6, 2003

(54) FIBRE CHANNEL UPGRADE PATH

(75) Inventor: Stephen J. Elliott, Sacramento, CA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 108 days.

(21) Appl. No.: 09/775,213

(22) Filed: Jan. 31, 2001

(65) Prior Publication Data

US 2003/0061440 A1 Mar. 27, 2003

(51) Int. Cl.[7] ............................................. G06F 13/16
(52) U.S. Cl. ..................... 711/114; 711/112; 711/113; 714/5; 714/6; 714/7; 370/532; 370/533
(58) Field of Search ..................... 711/112–114, 5–7; 714/5–7; 370/532–533

(56) References Cited

U.S. PATENT DOCUMENTS 5,155,845 A * 10/1992 Beal et al. ..................... 714/6
5,809,285 A * 9/1998 Hilland ....................... 395/500
6,098,155 A * 8/2000 Chong, Jr. .................. 711/138
6,195,703 B1 * 2/2001 Blumenau et al. .......... 709/238
6,239,888 B1 * 5/2001 Willebrand .................. 395/118
6,282,188 B1 * 8/2001 Hashemi et al. ............ 370/351

* cited by examiner

Primary Examiner—Reginald G. Bragdon
Assistant Examiner—Mehdi Namazi

(57) ABSTRACT

The present invention involves hierarchical storage controllers which enable a scalable storage system. The scalable storage system is capable of causing a very large amount of discrete disk units to appear as a single drive. The scalable storage system is organized into a hierarchical structure by providing a series of disk arrays in parallel with a controller via Fiber Channel connections to form a "virtual disk." The next level in the hierarchical structure is created by connecting a number of virtual disks and a higher level controller in parallel via higher bandwidth connections. This next assemblage of devices is configured to appear as a single drive. Also, the scalable storage system disposes increasingly sized RAM caches to increase system performance. Moreover, wave division multiplexing (WDM) may be utilized to communicate with a file server via a highest level controller.

18 Claims, 2 Drawing Sheets

FIBRE CHANNEL UPGRADE PATH

RELATED APPLICATIONS

The present invention is related to commonly assigned and co-pending U.S. patent Ser. No. 09/775,233, entitled "SWITCH-ON-THE-FLY GBIC DISK CHANNEL ADAPTER AND DISK CHANNEL SYSTEM," the disclosure of which is incorporated herein by reference.

TECHNICAL FIELD

The present invention relates to scalable mass storage and more particularly to a hierarchical arrangement of array controllers to provide a simplified upgrade path to facilitate high capacity storage capabilities via a single virtual device.

BACKGROUND

Enterprise resource planning systems and other sophisticated corporate data processing systems have gained substantial importance in recent years. Specifically, many corporate management theories posit that the success of an organization is directly related to the ability to gather and process enterprise information in an efficient and organized manner. To fulfill these goals, certain software companies have produced information management products such as RP/3 and the like. These types of software systems manage enormous amounts of information. Management of inventory levels, customer purchasing information, accounting data, employment information, and various other databases requires significant storage capacity. In addition, e-commerce has placed a premium upon transferring ordinary business operations to electronic work flows, thereby creating further storage capacity requirements. In addition, increased processing speed and capacity places greater demands upon storage resources.

Enterprises have attempted to provide large storage capacity for such enterprise applications in a number of ways. For example, the most rudimentary manner is to provide "just a bunch of disks" (JBODs). In this situation, an enterprise purchases a number of discrete drive units that individually provide storage capacity. In addition, JBODs utilize operating system resources to make the assemblage of disk units appear as a single device. For example, a UNIX platform may interface with each disk unit. Also, the UNIX platform manages storage on the disk units. Files are written to a individual disk unit by sending the file to the UNIX platform. The UNIX platform then handles the controller functions. This approach is problematic in many respects. First, the maintenance and on-going performance optimization of the UNIX platform requires sophisticated technical personnel. Moreover, this approach is not operationally efficient as storage capacity reaches significant levels. Accordingly, JBODs are unable to operate beyond certain storage level limits.

Also, disk arrays have been designed to address storage requirements. An exemplary disk array system is described in commonly assigned U.S. Pat. No. 5,392,244, entitled "MEMORY SYSTEMS WITH DATA STORAGE REDUNDANCY MANAGEMENT," the disclosure of which is incorporated herein by reference. In essence, a disk array is a system that utilizes a number of discrete disks and interfaces with a host system or systems in such a manner that the assemblage of discrete disks appears as a single disk system. Disk arrays present numerous advantages. For example, disk arrays are highly redundant. If a particular discrete disk fails, the remaining portion of the disk array remains in operation. Moreover, disk arrays permit data mirroring, i.e. the same data may be stored upon more than one disk to provide greater redundancy against discrete disk failure. Accordingly, the probability of data loss is thereby reduced. Also, the operation of the controller functions occurs automatically. Thus, it is not necessary to allocate significant technical personnel resources to maintain disk arrays.

Despite their obvious improvement over JBODs, known disk array systems possess certain limitations. Most importantly, disk arrays provide limited expansion capability. When storage capacity requirements become very large, smaller disk array systems may be replaced by a bunch of disks arrays connected via a hub. However, this defeats some of the inherent advantages of the disk array approach. Alternatively, larger disk arrays may be substituted when an organization's storage needs exceed current capacity. However, this is an expensive approach in that it causes the smaller disk arrays to become obsolete.

SUMMARY OF THE INVENTION

The present invention is directed to a system and method which utilize a hierarchical arrangement of storage controllers to provide a scalable storage system. The scalable storage system is preferably capable of causing a very large amount of discrete disk units to appear as a single drive. The present invention organizes the hierarchical structure by preferably providing a series of disk arrays in parallel via Fiber Channel connections to form a "virtual disk." This organization of disk arrays is called a virtual disk, since it is configured through the use of a controller to appear to function as a single disk. The next level in the hierarchical structure is created by connecting a series of virtual disks and a higher level controller in parallel utilizing a plurality of Fibre Channel connections. Again, the higher level controller is preferably configured such that the assemblage of storage devices appears as a single, albeit enormous, disk. Also, the present invention preferably disposes increasingly sized RAM caches in the controllers to increase performance. Moreover, the present invention may utilize wave division multiplexing (WDM) to communicate to a file server via a higher level controller.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
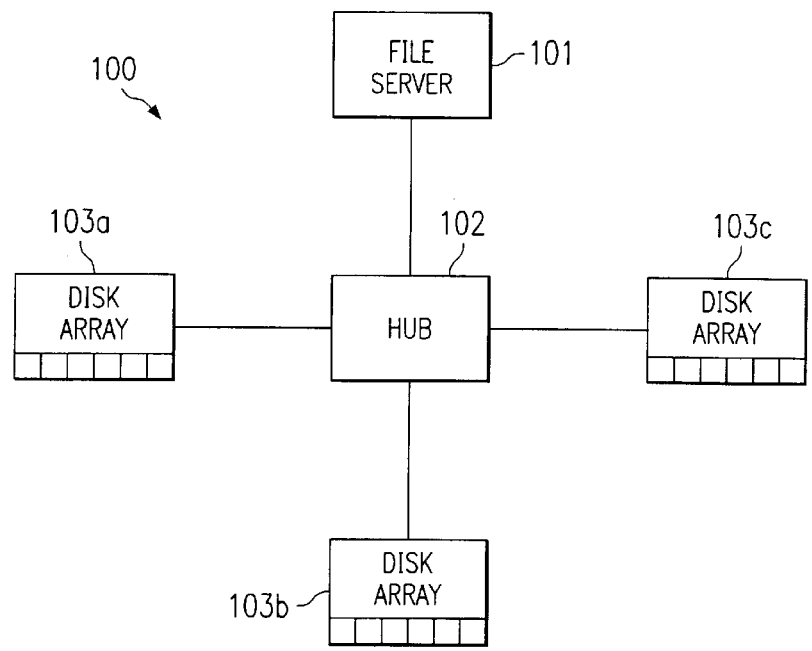
FIG. 1 illustrates an exemplary system representing known storage architectures.

Turning now to the figures, FIG. 1 depicts a known exemplary system architecture for the provision of significant storage capacity. System 100 comprises file server 101. File server 101 is connected to a plurality of disk arrays (103a–103c) via hub 102. Hub 102 does not provide any type of storage logic. Instead, hub 102 is essentially a switching component merely allowing access to the various disk arrays (103a–103c). Moreover, hub 102 does not provide any type of caching capability or buffer capacity. Also, hub 102 does not offer any redundant data storage functionality. Accordingly, the storage logic associated with managing storage across disk arrays 103a–103c is implemented in software disposed on file server 101.

This known system architecture is problematic in several respects. First, this architecture requires significant system configuration activities. Since each disk array is disposed on the system with connections to the system fabric, this architecture places a large demand on the system fabric. In practice, this logical structure is implemented utilizing redundant paths. In the event that a component malfunctions, diagnosis of the problem may prove exceptionally cumbersome. Moreover, this type of system is created and expanded on an ad hoc basis. There is no guiding principle or methodology to construct the arrangement. The expansion process occurs at the design of technical personnel and thus requires significant personnel resources to establish and optimize. Ad hoc evolution of the storage system may cause equipment to become obsolete. Also, storage retrieval is limited due to limited caching ability. Moreover, redundant storage mechanisms are sub-optimal since each of the plurality of disk arrays are discrete devices.

The present invention addresses these shortcomings by establishing a defined hierarchical structure for the expansion of storage capacity. Specifically, the present invention allows a discrete number of individual storage devices to be assembled and configured by a controller to appear as a single device or a virtual disk. Moreover, the present invention is hierarchical in that the invention can assemble and configure a plurality of lower level virtual disks to appear as a single upper level device. This process of iteratively assembling and configuring lower level devices to appear as a single device allows a simplified expansion of storage capacity. By configuring storage systems in such a fashion, the storage system architecture from the perspective of an associated file server appears constant. Thus, storage services are greatly simplified. Moreover, the present expansion path does not cause prior generations of storage devices to become obsolete. Instead, small storage systems may be subsumed into lower level storage hierarchies. Also, the present invention allows superior performance characteristics due to caching and redundant data storage.

Figure 2:
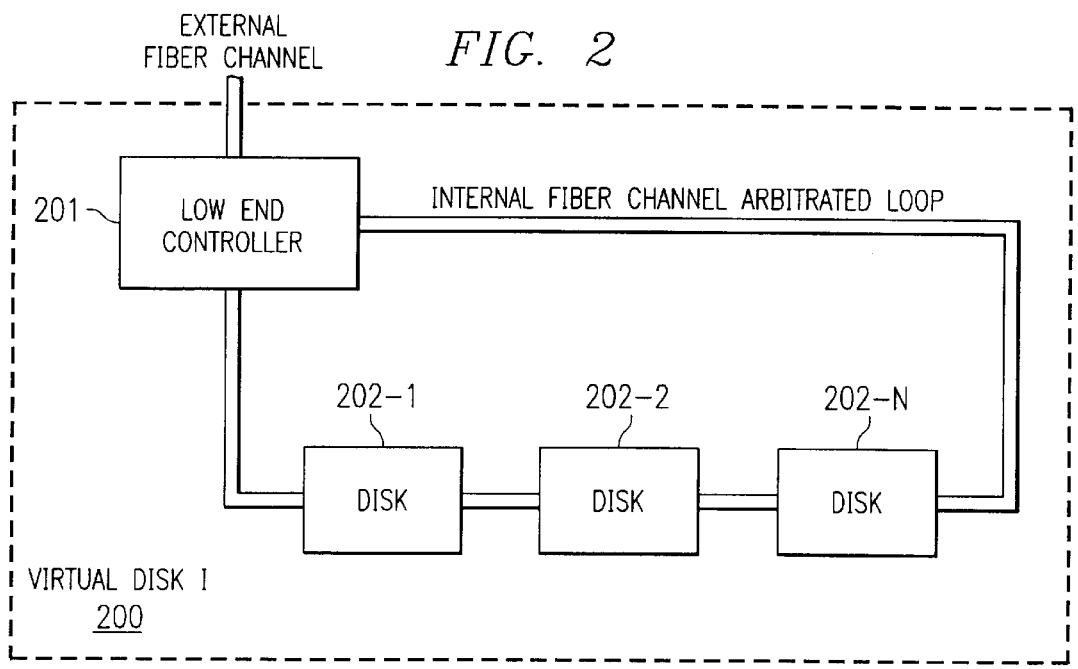
FIG. 2 illustrates an exemplary configuration for a lowest level virtual disk.

FIG. 2 illustrates the lowest level of a storage hierarchy. Virtual disk I 200 comprises low end controller 201. Low end controller 201 provides an external Fibre Channel connection for communication with external devices. From the perspective of exterior devices, virtual disk I 200 is a single disk. However, data received for storage is physically stored via a plurality of discrete disk units or just a bunch of disks (JBODs). Accordingly, virtual disk I 200 comprises disks 202-1 through 202-N. Internally, low end controller 201 preferably communicates with disks 202-1 through 202-N via a Fibre Channel arbitrated loop. The data may be stored on the disks 202-1, 202-2, and 202-N via redundant storage algorithms such as various RAID levels.

It shall be appreciated that Fibre Channel systems may utilize two different physical mediums in an interchangeable manner. First, Fibre Channel systems may utilize an optical fiber. Also, Fibre Channel systems may utilize twin axial copper cables. Accordingly, the term "fiber" as used herein shall interchangeability refer to either physical medium.

It is preferred to utilized a Fibre Channel (FC) arbitrated loop topology for several reasons. First, the FC arbitrated loop topology is a relatively simple topology and requires minimal configuration. Secondly, the FC physical medium provides very high bandwidth capabilities (within the gigabit range). This bandwidth is significantly greater than the bandwidth required by disks 202-1 through 202-N. Disks 202-1 through 202-N individually require relatively little bandwidth, since disks 202-1, 202-2, and 202-N utilize various mechanical operations to retrieve and store data. Therefore, gigabit communication capability is sufficient for this arrangement. Moreover, a large number of devices may be disposed on the FC arbitrated loop topology—approximately 250 drives may placed on the loop. Although the plurality of disks are preferably disposed in a Fibre Channel arbitrated loop topology, other arrangements may be employed. For example, disks (202-1 through 202-N) may be connected via a switching topology and may communicate with low end controller 201 utilizing any number of communication protocols. Low end controller 201 preferably manages the plurality of disks in such a manner that the assemblage of devices appears as a single disk.

This lowest level of the hierarchical architecture may be preferably implemented utilizing a disk array which is known in the art. In an alternative embodiment, the disk array may be replaced by an integrated storage system as described in U.S. patent Ser. No. 09/775,233, entitled "SWITCH-ON-THE-FLY GBIC DISK CHANNEL ADAPTER AND DISK CHANNEL SYSTEM," the disclosure of which is incorporated herein by reference. Furthermore, the disk array may be replaced by JBODs managed by a UNIX platform software application to act as a virtual disk. However, it is preferred to utilize a hardware implementation.

Figure 3:
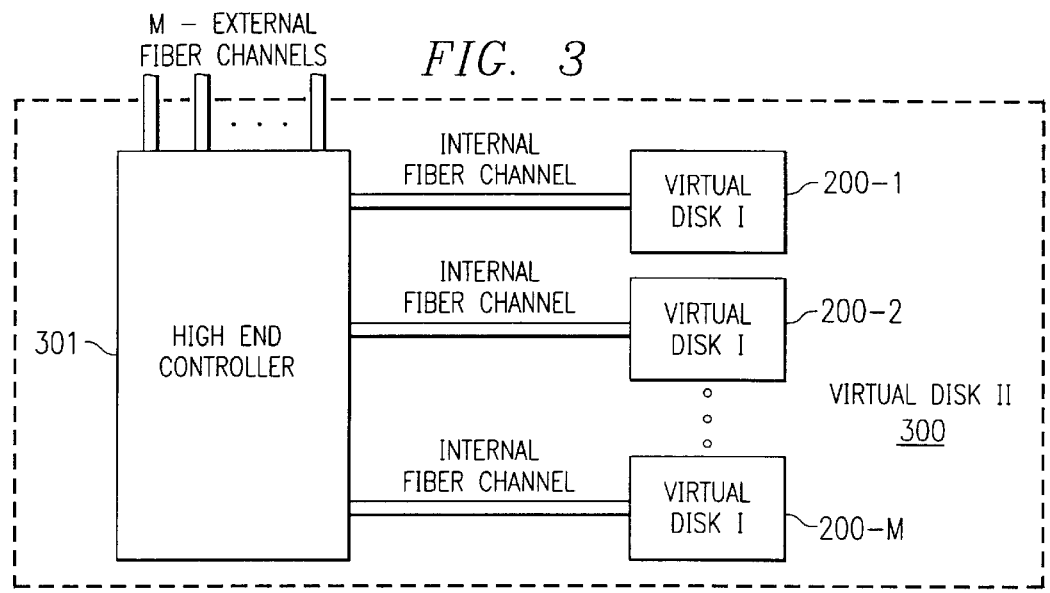
FIG. 3 illustrates an exemplary configuration for a higher level virtual disk.

The next level of this hierarchical arrangement is set forth in FIG. 3. Virtual disk II 300 similarly comprises a controller unit (high end controller 301). External communication with virtual disk II 300 occurs via high end controller 301. High end controller 301 manages internal storage communication and controls virtual disks I 200-1 through 202-M. High end controller 301 preferably manages external storage communication such that virtual disk II 300 appears as a single disk. A device communicating with virtual disk II 300 does not require any knowledge regarding the arrangement or management of internal components.

Although high end controller 301 provides similar functionality as low end controller 201, high end controller 301 operates in a significantly different manner. First, the bandwidth operations of high end controller 301 are substantially divergent. First, high end controller 301 must employ a significantly different internal communication mechanism. As previously noted, arbitrated loop topologies with serial communication protocols are utilized by virtual disk I 200. This topology relies upon the mechanically slow operations of discrete disk units. However, virtual disk II 300 does not comprise comparable communication characteristics. Each virtual disk I 200-1 may require significant bandwidth, since communication occurs between respective low end controllers and high end controller 301. Accordingly, high end controller 301 provides individual internal Fibre Channel connections to each virtual disk I. Thus, this star topology provides parallel connections to augment the internal communication bandwidth. Similarly, high end controller 301 utilizes expanded external bandwidth capabilities. In this illustrative embodiment, high end controller 301 provides a plurality of external Fibre Channel connections. Alternatively, a wave division multiplexing (WDM) channel may be utilized. The external bandwidth is correlated to the number of virtual disks associated with high end controller 301. However, the number of parallel links or total bandwidth may be reduced via caching as will be discussed in greater detail below.

Figure 4:
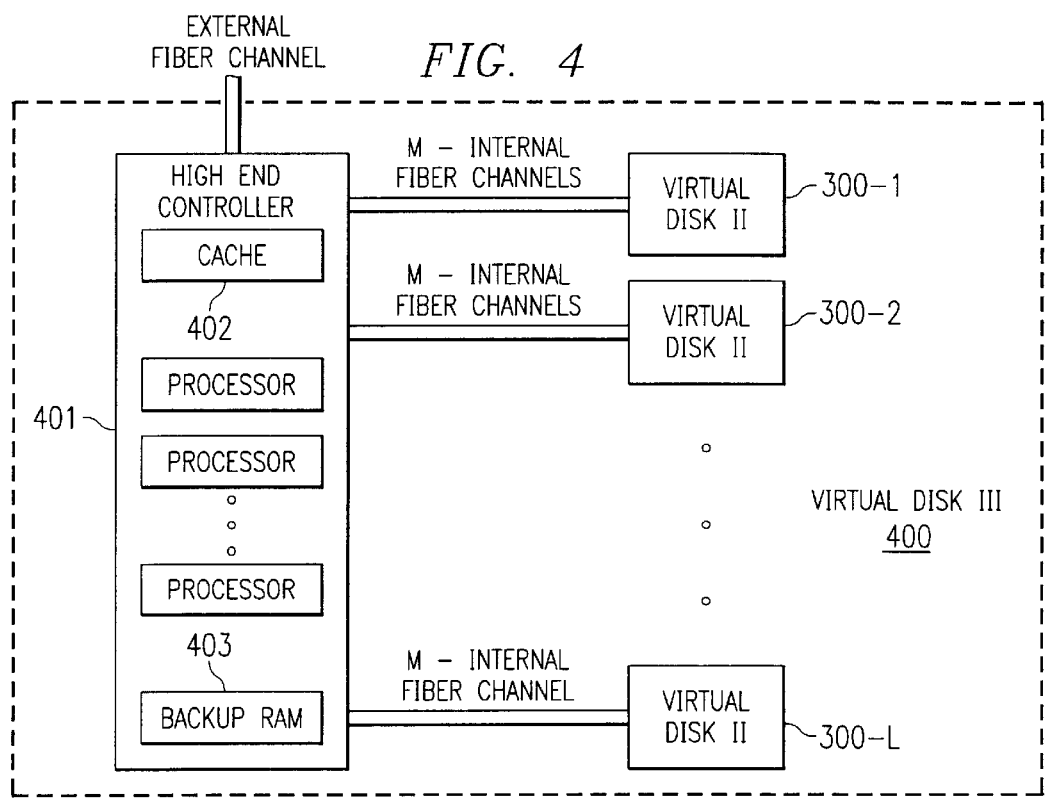
FIG. 4 illustrates an exemplary configuration for a highest level virtual disk.

Similarly, FIG. 4 extends this hierarchical arrangement. Virtual disk III 400 similarly comprises a controller unit (higher end controller 401). External communication with virtual disk III 400 occurs via higher end controller 401. Higher end controller 401 manages internal storage communication and controls virtual disks II 300-1 through 300-L. Higher end controller 401 preferably manages external storage communication such that virtual disk III 400 appears as a single disk. A device communicating with virtual disk III 400 does not require any knowledge regarding the arrangement or management of internal components.

Higher end controller 401 is also optimized to provide greater bandwidth capabilities. First, internal processing is preferably implemented in a parallel architecture. Specifically, higher end controller 401 preferably utilizes a plurality of high speed processors to provide concurrent multichannel processing. Moreover, higher end controller 401 may utilize optical driven signal processing in addition to traditional electronic signal processing to increase its bandwidth capabilities. Also, higher end controller 401 communicates with virtual disk II 300-1 through 300-L via parallel high bandwidth connections. Specifically, each virtual disk II is connected with higher end controller 401 via a plurality of internal Fibre Channel connections. Moreover, additional bandwidth capability is provided to higher end controller 401 via an external wave division multiplexing (WDM) channel connection. The external WDM channel connection is advantageous for several reasons. First, the WDM connection allows communication at a very high data rate. For example, data rates over 10 gigabits may be achieved by utilizing multiple optical channels through wavelength multiplexing. Moreover, WDM may be employed on the same physical medium as Fibre Channel communication systems. Accordingly, upgrading storage capabilities to include higher end controller 401 does not require obsolescence of existing Fibre Channel connections. This is a very significant cost advantage, since physically replacing optical fibers is an extremely cost intensive task.

Figure 5:
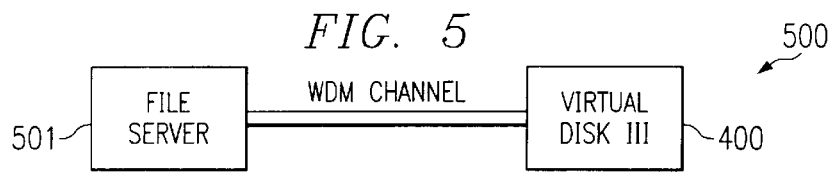
FIG. 5 illustrates an exemplary configuration for connection of a highest level virtual disk and a file server.

FIG. 5 illustrates an exemplary configuration for connection of virtual disk III 400 and file server 501. From the perspective of file server 501, there is only one storage device despite the fact that a significant number of devices are subsumed within virtual disk III 400. Thus, virtual disk III 400 acts as a single disk. Accordingly, any of the storage mechanisms associated with a single disk may be employed. For example, file server 501 may partition virtual disk III 400 into distinct network drives. However, virtual disk III 400 actually manages physically storing and retrieving data storage on discrete sub-components in response to file server 501's partition scheme.

Moreover, the present invention utilizes caching to optimize I/O operations. Specifically, the present invention preferably disposes caches in low end controller 201, high end controller 301, and higher end controller 401. Higher end controller 401 preferably comprises a largest buffer (shown as cache 402 in FIG. 4) to perform the caching mechanism. The buffer of high end controller 401 may preferably be selected in proportion to the maximum number of virtual disks II 300 that may be connected to high end controller 401. Now, the bandwidth requirements of high end controller 301 are less than the bandwidth requirements of higher end controller 401. Accordingly, the cache size may be reduced for high end controller 301. However, it is preferred to dispose a sizeable cache with higher end controller 401. Similarly, low end controller 204 may comprises a successively smaller buffer to optimize performance via caching.

It shall be appreciated that the use of caching in connection with the present invention provides numerous advantages. The use of caching provides significant performance increases by reducing the amount of traffic over the various internal communication channels. Specifically, caching may optimize performance in light of bandwidth limitations over specific Fibre Channel connections and the slow mechanical operations of discrete drives. Moreover, the use of caching increases the reliability of the entire storage system. In a preferred embodiment, various redundant data storage and other reliability mechanisms are implemented directly on the caches. Moreover, the present invention may augment the implementation of RAID level 5 (a redundant storage algorithm that is well known in the art). The present invention preferably disposes a RAM drive (e.g., RAM drive 403 of higher end controller 401 as shown in FIG. 4) with various controllers. Accordingly, the present invention may utilize a RAM drive as a backup drive. The use of caching and RAM drives provides superior performance because memory is actually more reliable than disk media. The reliability actually reduces the cost of the device per unit of storage capacity. Specifically, the greater degree of reliability reduces the necessity of mirroring data on various drives. Accordingly, this reduces the number of physical drives necessary to store data with minimal probability of data corruption.

Moreover, the preceding hierarchical structure of creating successively larger virtual disk is advantageous for several reasons. First, it overcomes the limitation upon the number of devices disposed on a single arbitrated loop. This is due to the inherent limitations of the Fibre Channel protocols. Secondly, it facilitates scalability of the data storage architecture. When an organization determines that it has reached the limits of a particular hierarchical level, it may incorporate that level into a new arbitrated loop. Thus, the present invention does not cause the obsolescence of any system component. Each component may be subsumed into a new hierarchical arrangement. However, the creation of additional hierarchical structures does not fundamentally change the view of the data storage architecture to exterior systems. Instead, the architecture appears as a single, albeit large, storage disk. Moreover, the present invention provides a clear expansion path. Previous generations of storage devices may be simply added to a new controller via an arbitrated loop. Thus, the present invention permits expansion via plug-in capabilities. Accordingly, the complexity and expense of storage expansion is greatly reduced.

Also, the hierarchical structure provides far greater reliability than hub-related software solutions. In this structure, each controller is capable of controlling each lower level device. However, software solutions cannot provide any comparable degree of reliability. Also, the hierarchical disposition of controllers provides greater diagnostic capabilities. Specifically, each controller is responsible for managing hardware components disposed beneath it within the hardware arrangement. By doing so, malfunctioning mechanisms may be quicky identified in association with specific hardware units. By doing so, the respective hardware units may be replaced or repaired. However, software solutions are far more difficult to debug and correct. It is much more difficult to pinpoint an error in a discrete software routine among thousands of routines. Moreover, it is frequently difficult to ascertain whether a software data storage application is malfunctioning or simply misconfigured. Also, software storage applications associated with JBODs are problematic in that the software applications must be individually optimized since they are designed to operate on any number of system architectures and configurations. Moreover, software applications associated with hub-based architectures cannot match the performance characteristics of the present invention. Specifically, the latency associated with software storage applications is too great to operate with very significant storage levels.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated storage system, comprising:
a first controller device connected to a plurality of second controller devices via a first high bandwidth communication fabric, wherein the first controller device makes the plurality of second controller devices appear as a single device, wherein said first controller device comprises a parallel architecture that includes a plurality of processors for providing concurrent multichannel processing, wherein said first high bandwidth communication fabric provides at least one separate communication link between said first controller device and each of said plurality of second controller devices, and wherein the first controller device communicates with a file server using wave division multiplexing;
each of said second controller devices being connected to a respective plurality of storage devices by a secondary high bandwidth communication fabric, wherein each of said second controller devices makes its respective plurality of storage devices appear as a single device to the first controller device.

2. The integrated storage system of claim 1, wherein the secondary high bandwidth communication fabric is a Fibre Channel arbitrated loop.

3. The integrated storage system of claim 1, wherein the first high bandwidth communication fabric is a star topology of Fibre Channel links.

4. The integrated storage system of clam 1, wherein the first high bandwidth communication fabric includes wave division multiplexing links.

5. The integrated storage system of claim 1 wherein the integrated storage system implements RAID level 5.

6. The integrated storage system of claim 1 wherein the second controller devices include a cache.

7. The integrated storage system of claim 1 wherein the first controller device comprises a primary cache, wherein the primary cache is proportional to a maximum number of connected secondary controller devices.

8. The integrated storage system of claim 1 wherein the first controller device comprises a backup RAM drive.

9. The integrated storage system of claim 1 wherein the second controller device comprises a backup RAM drive.

10. A method of providing integrated storage, comprising the steps of:
associating a first controller device with a plurality of second controller devices via a first high bandwidth communication fabric that includes at least one separate communication link for each of said plurality of second controller devices, wherein the first controller device makes the plurality of second controller devices appear as a single device, wherein said first controller device comprises a parallel architecture that includes a plurality of processors for providing concurrent multichannel processing, and wherein said first controller device communicates with a file server using a wave division multiplexing; and
operating each second controller device of the plurality of second controller devices to manage a respective plurality of storage devices over a secondary high bandwidth communication fabric to make it respective plurality of storage devices appear as a single device to the first controller.

11. The method of claim 10, wherein the secondary high bandwidth communication fabric is a Fibre Channel arbitrated loop.

12. The method of claim 10, wherein the first high bandwidth communication fabric is a star topology of Fibre Channel links.

13. The method of claim 10, wherein the first high bandwidth communication fabric includes wave division multiplexing links.

14. The method of claim 10 further comprising the steps of:
receiving storage information; and
storing said storage information upon storage devices using RAID level 5.

15. The method of 10 wherein the second controller devices include a cache.

16. The method of claim 10 wherein the first controller device comprises a primary cache, wherein the primary cache is proportional to a maximum number of connected secondary controller devices.

17. The method claim 10 wherein the first controller device comprises a backup RAM drive.

18. The method of claim 10 wherein the second controller device comprises a backup RAM drive.

* * * * *